United States Patent [19]

Graversen et al.

[11] 4,139,150
[45] Feb. 13, 1979

[54] SLIDE VALVE

[75] Inventors: Niels P. G. Graversen, Augustenborg; John Porland, Sonderborg, both of Denmark

[73] Assignee: Danfoss A/S, Nordborg, Denmark

[21] Appl. No.: 794,310

[22] Filed: May 5, 1977

[30] Foreign Application Priority Data

May 10, 1976 [DE] Fed. Rep. of Germany ....... 2620558

[51] Int. Cl.² .............................................. F28F 27/02
[52] U.S. Cl. ...................................... 236/1 B; 165/40; 236/93 A
[58] Field of Search ...................... 236/1 B, 1 C, 93 A, 236/93 R, 100; 165/40; 137/269; 251/326

[56] References Cited

U.S. PATENT DOCUMENTS

| 2,575,100 | 11/1951 | Duey | 236/1 C |
| 3,273,796 | 9/1966 | Bauerlein | 236/1 B |

*Primary Examiner*—William E. Wayner
*Attorney, Agent, or Firm*—Wayne B. Easton

[57] ABSTRACT

The invention relates to a combination heating and cooling valve assembly having a housing with horizontally aligned inlet and outlet ports and a second outlet port which opens downwardly at right angles to the other two ports. A movable valve plate having an aperture and upper and lower closure portions cooperates with the first outlet port. The valve plate has two closed positions corresponding to heating and cooling operations with either the upper or lower closure portion thereof covering the outlet port. A valve rod unit connected to the valve plate has a temperature responsive expansible link for lengthening and shortening the effective length of the rod unit depending on whether the valve assembly is controlling a cooling or heating medium. The expansible rod link is accessible to the heating or cooling medium which supplies the heat or cold for operating the link.

2 Claims, 5 Drawing Figures

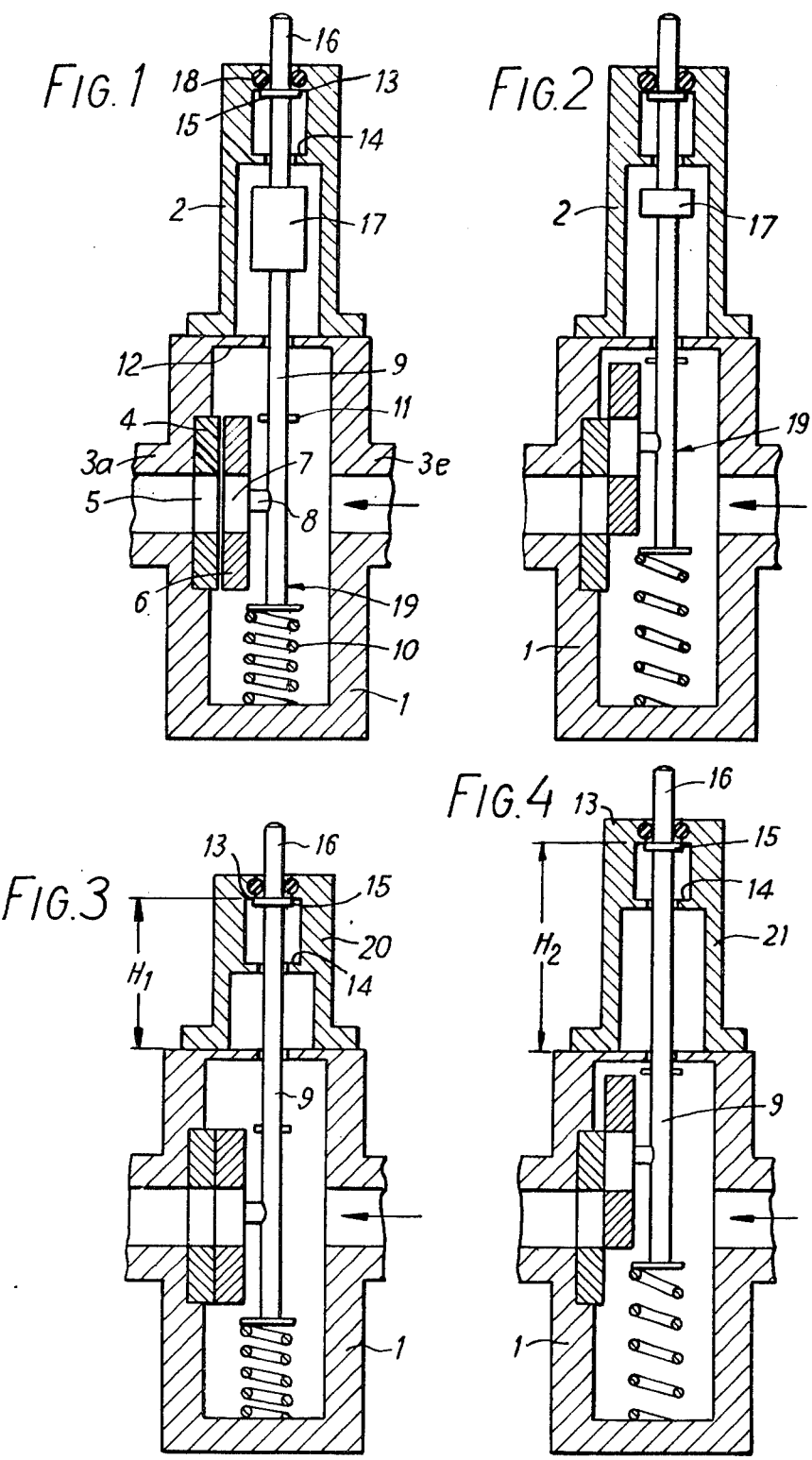

SLIDE VALVE

The invention relates to a slide valve of which the opening cross-section is determined by the relative position of a fixed housing plate having an aperture and a slide displaceable in relation thereto, and in which at least one end position is determined by adjustable abutment means comprising at least one abutment connected to the valve shank and at least one counterbearing fixed with respect to the housing, particularly comprising a valve housing, an actuating attachment and a multi-part valve shank of which the parts are non-positively connected by a valve spring.

In a known slide valve the housing plate is formed on an insert that is fixed with respect to the housing. The plate-shaped slide is pushed directly onto the valve shank. It completely covers the aperture in the housing plate in the one end position and exposes it completely after one operating stroke. The valve shank consists of three parts of which the first is associated with the valve housing, the second with a sealing insert and the third with the actuating attachment. The rest end position is defined by the fact that the base of corrugated tubular bellows of the thermostatic operating element lies against a counterbearing surface of the actuating attachment. The operating end position is defined in that the base of sealing corrugated tubular bellows lies against a counterbearing surface of the sealing insert. The first-mentioned counterbearing surface is adjustable to a limited extent by means of a nut on the associated valve shank section. This valve operates as a cooling valve which permits a larger amount of refrigerant to flow with an increase in the sensor temperature or, expressed generally, works as a normally closed valve.

It is also known to use such slide valves as normally open valves, e.g. as heating valves, which, on an increase in the sensor temperature, throttle the supply of a heat carrier. The valves can be regulated in relation to a temperature, a pressure or any other conventional control quantity.

The invention is based on the problem of reducing the production costs of such slide valves.

This problem is solved according to the invention in that the abutment is displaceable with respect to the slide or the counterbearing with respect to the housing plate by substantially the length of the operating stroke of the slide.

By means of this feature, a normally open valve can be produced from a normally closed valve merely by displacing the abutments or counterbearings. If the displacement takes place automatically, one obtains a switching-over valve. In all cases the slide valve remains unaltered in other respects; it is only a different region of the overlap between the slide and the housing plate that is selected. Consequently one for the most part obtains large numbers for all the valve components. This constitutes rationalisation which makes production cheaper.

It is of particular advantage if the abutment means are disposed in an upper portion made separately from the rest of the valve housing. The choice of the respective upper portion then determines the function of the valve. The actuating attachment can be secured to the upper portion. Desirably, the upper portion is associated with its own section of the valve shank. The upper portion can then be readily taken off at a later date for the purpose of possible repair. It is thus possible to provide two like and exchangeable upper portions with fixed counterbearings, of which the heights measured to the counterbearings differ by about the length of the operating stroke. One obtains a normally open or normally closed valve merely by choosing the larger or smaller upper portion.

Another possibility is that the length of the valve shank is adjustable by about the length of the operating stroke. The shank is then displaceable on the one hand by the length of the operating stroke and on the other by a length lying between the length of the operating stroke and twice the length of the operating stroke, so that there will be no displacement of the closing point.

In a particularly preferred embodiment, a section of the valve shank comprises two relatively displaceable portions which are adjustable by a thermostatic switching-over element between two limiting positions spaced apart by about the length of the operating stroke. Such a switching-over element effects an automatic change in the function of the valve in dependence on the valve temperature. In an air-conditioning plant one in this way obtains automatic switching-over from a heating valve to a cooling valve governed by whether the valve is supplied with hot or cold water.

From a constructional point of view, it has proved favourable for the thermostatic switching-over element to comprise a cylinder which is filled with an expansible substance such as wax and which is disposed in a sheet metal cup and is pressed by a pressure spring at the base of the cup against an intermediate wall connected to the cup, and also an actuating pin which is passed through the intermediate wall and carries an extension with a flange lying against the intermediate wall or an end wall secured to the cup.

Further, it is recommended that the or another housing plate be disposed in a plane perpendicular to the valve shank on the side of the valve housing opposite to the abutment means and that the associated slide should pass through the aperture of the housing plate and has guide ribs on both sides of a central throttling member which fills out the opening cross-section. In conjunction with the displaceable abutments or counterbearings, such a slide also permits a normally open or a normally closed valve to be produced or one that can be switched over. If such a slide is combined with the slide that covers a housing plate extending parallel to the shank, one can produce a three-way valve which is, for example, suitable for two-tube air-conditioning installations with constant water flow, in which a portion of the heat carrier is always led past the heat exchanger.

If the throttle member is conically tapered on both sides, one can produce a throughflow characteristic that is dependent on the stroke, so that throughflow curves that overlap or are adapted to one another are obtained in the two branches. It is also possible to have a different groove shape for the cooling and heating operation so as to achieve the required stability of control.

Further, the slide or its carrier may be held on a screwthread of the valve housing valve shank section and this section may have at one end a slot or the like for engagement by a tool. In this way the rest position of the slide can be very accurately set.

It is also favourable if the upper portion carries a sealing insert at the upper end. If the valve shank is here sealingly led out, one can keep the interior of the upper portion in communication with the heat carrier and, for example, bring the switching-over means into direct contact with the heat carrier.

Also, the valve housing valve shank section should carry an abutment co-operating with a housing covering wall. On removal of the upper portion it is then ensured that this valve shank section projects from the valve housing only to a limited extent. In addition, the abutment can serve as a secondary seal permitting removal of the upper portion, e.g. for replacing the switching-over element, without emptying the installation.

The invention will now be described in more detail with reference to the drawing, wherein:

FIG. 1 is a diagrammatic representation of a normally open slide valve with switching-over element;

FIG. 2 shows the same valve which operates as a normally closed valve as a result of shortening the valve shank by means of the switching-over element;

FIG. 3 is a diagrammatic representation of a normally open slide valve;

FIG. 4 is a diagrammatic representation of the same valve with a different upper portion for forming a normally closed valve.

Figure 5:
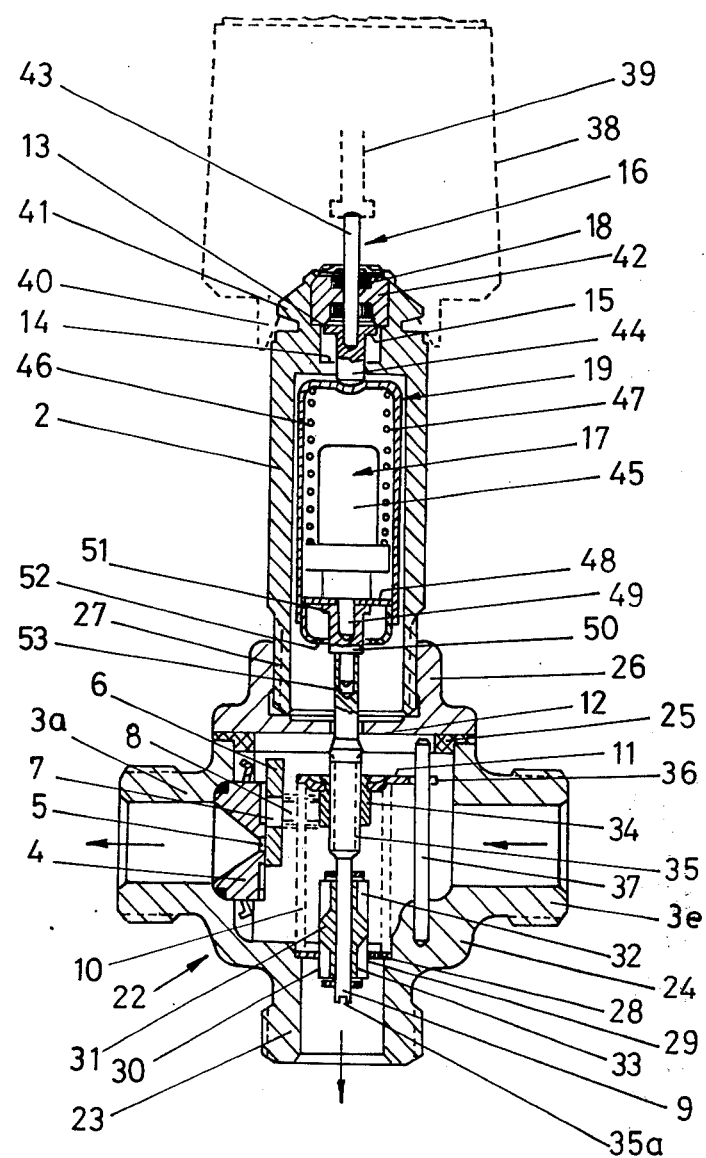
FIG. 5 is a longitudinal section of the constructional embodiment of a three-way slide valve with switching-over element.

In the embodiment of FIGS. 1 and 2, the valve housing consists of a lower portion 1 and an upper portion 2. The lower portion comprises an inlet connection 3e and an outlet connection 3a. The latter is preceded by a housing plate 4 with an aperture 5. On this there is displaceably held a slide 6 which likewise has an aperture 7. It is connected by a dog 8 to a valve shank section 9 which is pressed upwardly by a valve spring 10. The outermost position is determined by an abutment 11 lying against a covering wall 12. The upper portion 2 comprises two fixed counterbearings 13 and 14 which co-operate with an abutment 15 formed on a valve shank section 16. A further valve shank section is formed by a switching-over element 17 which, as a comparison with FIG. 2 will show, can alter its length, e.g. in dependence on the temperature. The valve shank section 16 is led out through a seal 18. The valve shank sections 9, 16 and 17 form a valve shank 19 of variable length. To adjust the valve, the valve shank 19 is adjusted from the top against the force of the valve spring 10.

FIG. 1 shows a normally open valve to be used as a heating valve. When a thermostatic actuating element pressing downwardly on the valve shank 19 with an increase in temperature is placed on the upper portion 2, the valve first throttles and then closes. This function is desired when supplying a heating medium. On the other hand, when the switching-over element 18 is reduced in length so that the entire valve shank 19 becomes shorter, one obtains a normally closed valve that can be used as a cooling valve. Whilst maintaining the described actuating mechanism, the valve is now gradually opened with an increase in temperature, as is desired for controlling a refrigerant. Switching-over of the switching-over element 17 can take place in dependence on the temperature of the heat carrier flowing through the valve.

In FIG. 3, the same lower portion 1 with associated valve shank section 9 is combined with another upper portion 20 which again carries two counterbearing surfaces 13 and 14 for the abutment 15 on the valve shank section 16. The height $H_1$ of this upper portion 20 measured up to the counterbearing 13 is such that a normally open valve is obtained which is closed during the course of valve actuation.

In FIG. 4, the same lower portion 1 of the housing is combined with an upper portion 21 which differs from the upper portion 20 merely in that the height $H_2$ measured up to the counterbearing 13 is chosen to be larger so that a normally closed valve is achieved which opens during valve actuation.

Merely by exchanging the upper portions one therefore obtains a heating valve (FIG. 3), a cooling valve (FIG. 4) or a heating valve/cooling valve that can be switched over (FIGS. 1 and 2).

FIG. 5 shows the constructional embodiment of a valve as in FIGS. 1 and 2 that can be switched over, with the difference that a second outlet connection 23 is provided in the lower portion 22. The lower portion 22 comprises a cast body 24 to the top of which there is secured, with the interpositioning of a seal 25, a cover 26 into the screwthread 27 of which the upper portion 2 can be screwed on. A second housing plate 28 comprises a circular aperture 29 through which a second slide 30 engages. The latter has a central throttling member 31 which is conically tapered at both sides, fills the aperture 29 completely and possesses guide ribs 32, 33 on both sides thereof.

The second slide 30 is clamped onto the valve shank section 9. The dogs 8 for the first slide are secured on a screw-threaded sleeve 34 by means of a plate serving as an abutment, a screwthread 35 of the valve shank section 9 engaging through the sleeve 34. The plate has a bifurcated extension 36 engaging around a pin 37 that is fixed with respect to the housing. If a screwdriver is applied to a slot 35a of the valve shank section 9, one can change the elevation of the slide 6 by turning this valve shank section 9.

A thermostatic actuating attachment 38 is shown in broken lines, which comprises a thermostatic operating element that tends to press on the valve shank 19 by means of an actuating shank 39. The attachment 38 is clamped onto a bead 41 of the upper portion 2 by means of feet 40. The seal 18 is accommodated in an insert 42 of which the underside forms the counterbearing 13. The valve shank section 16 consists of a pin 43 and an extension 44 that carries the abutment 15.

The switching-over element 17 comprises a wax-filled cylinder 45 disposed in a sheet metal cup 46 and pressed against an intermediate wall 48 by a pressure spring 47 that is supported at the base of the sheet metal cup. It possesses an actuating pin 49 which carries an extension attachment 50 with flange 51 which comes to lie against the intermediate wall 48 or an end wall 52 secured to the sheet metal cup. This extension attachment 50 in turn engages in a hole 53 at the top of the valve shank section 9.

The slide valve shown in FIG. 5 serves to control the heating or cooling medium to a heat exchanger in which a portion of the heat carrier is led through the pair of first housing plate 4 and first slide 6 and past which the remainder is led through the second pair of housing plate 28 and slide 30. To obtain a substantially constant throughflow, the valve formed by the second pair is to close with an increase in the opening of the valve formed by the first pair. The special construction with the throttle member 31 serves this purpose. In the illustrated position the valve works as a cooling valve. The valve shank 19 has its short length. With an increase in temperature, the valve 4, 6 opens under the influence of the thermostatic actuating element 38 whilst the valve 28, 30 closes progressively. If, now, the central operating station switches from cooling to heating operation, and a cooling medium is supplied instead of a heating medium, the wax in the switching-over element 17 expands until the flange 51 lies against the end wall 52. This results in a longer valve shank 19. The valve 4, 6 operates as a heating valve which closes with an increase in temperature whilst the valve 28, 30 opens simultaneously.

We claim:

1. A combination heating and cooling valve assembly, comprising a housing having inlet and outlet ports with said outlet port having a particular height, a movable valve plate cooperable with said outlet port, said valve plate having an aperture and upper and lower closure portions, said valve plate having first and second closed positions corresponding to heating and cooling operations wherein said upper and lower closer portions respectively close said aperture, valve operating rod means connected to said valve plate and being movable relative to said housing, temperature responsive expansible link means between the ends of said rod means for lengthening or shortening said rod means, spring means for biasing said rod means in an upward direction, a second outlet port aligned with said rod means, a closure member attached to the end of said rod means for fluid control cooperation with said second port with the opening and closing of said second outlet port being generally opposite to the opening and closing of said first outlet port.

2. A valve assembly according to claim 1 wherein said closure member is conically tapered on both sides thereof.

* * * * *